United States Patent [19]
Heck

[11] Patent Number: 5,595,370
[45] Date of Patent: Jan. 21, 1997

[54] TEXAS GATE

[75] Inventor: Eugene J. Heck, Bodo, Canada

[73] Assignee: Bodo Oilfield Maintenance Ltd., Bodo, Canada

[21] Appl. No.: 523,181

[22] Filed: Sep. 5, 1995

[51] Int. Cl.⁶ ............................................. E01B 17/00
[52] U.S. Cl. ........................................ 256/17; 256/14
[58] Field of Search ............................ 256/14, 15, 16, 256/17, 18; 49/131

[56] References Cited

U.S. PATENT DOCUMENTS

| | | |
|---|---|---|
| 575,921 | 1/1897 | Compton . |
| 645,240 | 3/1900 | Wallace ................................. 256/14 |
| 653,128 | 7/1900 | Adams . |
| 890,324 | 6/1908 | Allen . |
| 931,537 | 8/1909 | Wheeler . |
| 2,539,214 | 1/1951 | Warner . |
| 4,844,423 | 7/1989 | Combs . |
| 5,203,544 | 4/1993 | Webb . |

FOREIGN PATENT DOCUMENTS

| 158473 | 5/1954 | Australia . |
|---|---|---|
| 957190 | 11/1974 | Canada . |

*Primary Examiner*—Anthony Knight
*Attorney, Agent, or Firm*—John W. Ross

[57] ABSTRACT

The Texas gate includes a base frame adapted to be set into a roadway and a deck assembly secured to said base frame. The deck assembly includes a series of spaced parallel elongated deck members arranged in groups. First and second groups of said deck members are fixed to said base frame in spaced apart flanking relation to a central region of the gate assembly. At least one further group of deck members is pivotally mounted for movement from a lowered position overlying said central region and supported on said base frame in co-planar relation to said first and second groups of deck members to a raised position providing access to an area beneath said central region of the gate assembly to facilitate removal of debris and/or to provide a barrier to road traffic. In a further aspect of the invention there are two said further groups of deck members, each said further group being pivotally mounted for rotation in opposing directions away from one another relative to said first and second groups between said raised and lowered positions.

9 Claims, 4 Drawing Sheets

TEXAS GATE

BACKGROUND OF THE INVENTION

This invention relates to improvements in Texas gates, otherwise known as cattle grills or guards.

The prior art has provided various forms of Texas gates or cattle grills which are in the form of gratings set in the ground in a gap in a fence, hedge or wall to take the place of a gate. A wheeled vehicle can readily be driven across such a gate but cattle, horses, sheep, deer and most other animals cannot or will not cross it as their feet would tend to pass between the bars or tubes of the Texas gate and into a shallow pit typically provided therebeneath.

While the Texas gates provided by the prior art have been more or less successful, they are subject to a number of conditions and problems. For example, debris tends to build up in the shallow pit provided beneath the gate and this must be cleaned out periodically but the prior art designs do not tend to facilitate this task. Reference may be had here to U.S. Pat. No. 2,539,214 to Warner wherein clean-out of debris can be achieved by removal of the flexible straps, but they must be removed one-by-one by unscrewing nuts and bolts; there is no ready access. Furthermore, U.S. Pat. No. 5,203,544 to Webb shows grill sections that can be removed for clean-out purposes, but they must be lifted out, i.e. they are not hinged. In addition, many Texas gate designs do not provide an effective barrier to vehicular traffic. It is often desirable to use these gates on access roads to oil well sites and the like and at times it may be desirable to prevent vehicles from crossing the gate, especially in restricted areas. As shown in Australian Patent 158,473 to Taylor the two halves of the gate swing upward and outward to the sides of the roadway providing ready access for clean-out purposes, but they do not create a vehicular barrier. In addition, especially in the case of oil well sites, once operations have been completed, the access road will be closed and abandoned and it would be desirable to be able to remove the complete Texas gate assembly and to transport it to another site thus eliminating or reducing wastage of equipment and materials. Reference is made here to U.S. Pat. No. 4,844,423 to Combs for a portable Pop-up-Guard, but it must be de-assembled first and cannot be moved as a unit. Hence it can be seen that the presently known prior art Texas gate designs do not appear to have made adequate provision for all of the above conditions and problems in a single gate construction.

OBJECTS AND SUMMARY OF THE INVENTION

It is therefore a general object of the present invention to provide an improved Texas gate arrangement, wherein provision is made to facilitate removal of debris from the region or pit beneath the gate and also to provide a temporary barrier to vehicular traffic when it is desired. It is also a further objective to provide an improved Texas gate assembly wherein the entire assembly including its base frame may be removed from the roadway and transported to another site while at the same time the Texas gate assembly is of a relatively simple yet sturdy construction enabling it to be manufactured at a relatively low cost.

A Texas gate assembly in accordance with one aspect of the invention includes a base frame adapted to be set into a roadway and a deck assembly secured to said base frame. The deck assembly includes a series of spaced parallel elongated deck members arranged in groups. First and second groups of said deck members are fixed to said base frame in spaced apart flanking relation to a central region of the gate assembly. At least one further group of deck members is pivotally mounted for movement from a lowered position overlying said central region and supported on said base frame in co-planar relation to said first and second groups of deck members to a raised position providing access to an area beneath said central region of the gate assembly to facilitate removal of debris therefrom and/or to provide a barrier to road traffic.

In a further aspect of the invention there are two said further groups of deck members, each said further group being pivotally mounted for rotation in opposing directions away from one another relative to said first and second groups between said raised and lowered positions.

In a still further aspect of the invention the deck members of said pivotally mounted further groups are rigidly secured together by spaced apart hinge plates, the hinge plates of each of the further groups being rotatably mounted to respective ones of the fixed deck members of the fixed first and second groups.

In a preferred form of the invention said elongated deck members comprise tubular members (e.g. pipes).

In a preferred form of the invention said hinge plates are provided with spaced apertures through which the deck members extend. The deck members are welded to said hinge plates and each said hinge plate is provided with a hinge collar to facilitate rotation thereof about the associated fixed deck members of the first and second groups.

Still further according to an aspect of the invention said base frame comprises a spaced pair of longitudinal sills extending parallel to said deck members. A plurality of spaced apart parallel sills are supported on and fixed to said longitudinal sills and extend transversely thereto, with said deck assembly being disposed on said transversely extending sills with said first and second groups of deck members being fixed thereto.

In the preferred form of the invention said deck members and said base frame sills comprise steel pipes, said sills being of substantially greater diameter than said deck members.

Further features and advantages of the invention will become more readily apparent from the following description of a preferred embodiment of the invention taken in conjunction with the appended drawings.

BRIEF DESCRIPTIONS OF THE VIEWS OF DRAWINGS

DETAILED DESCRIPTION OF THE PREFERRED EMBODIMENT

Figure 1:
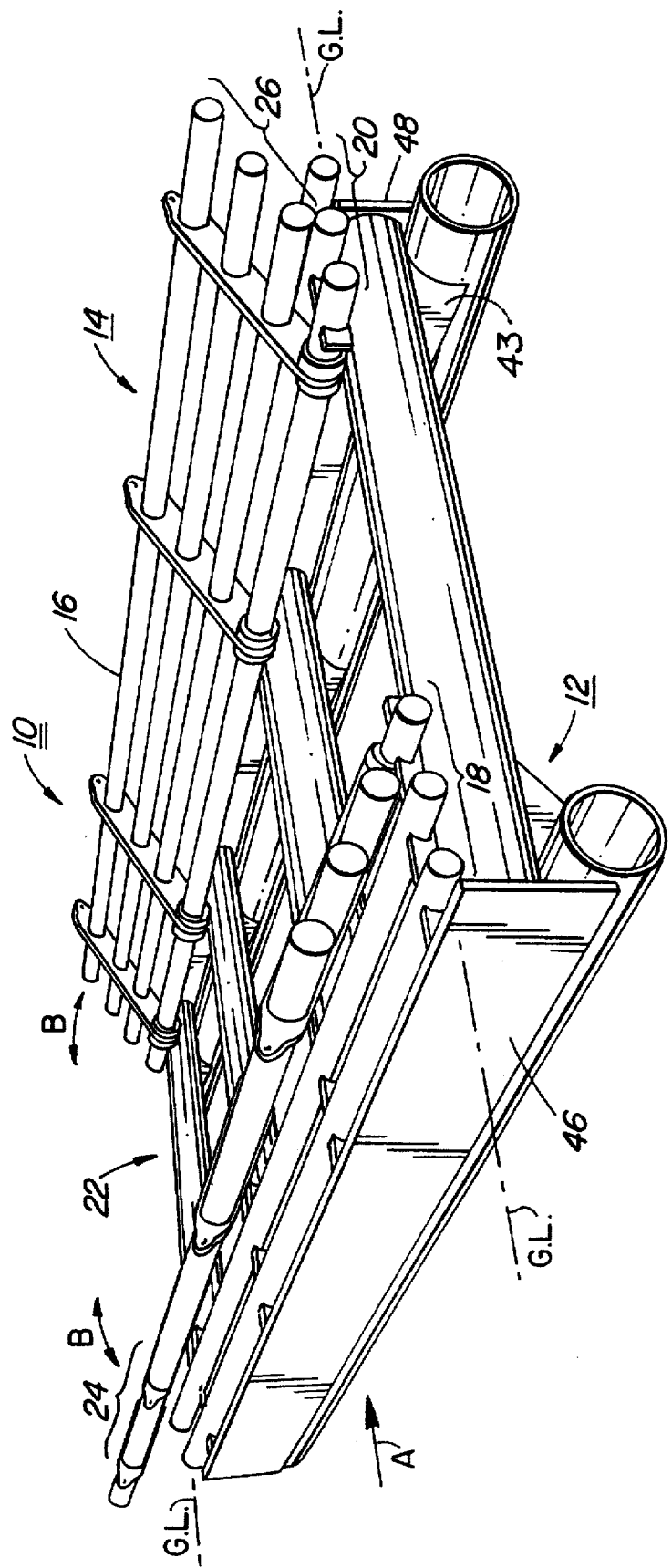
FIG. 1 is a perspective view of a Texas gate assembly in accordance with the present invention with the pivotally mounted groups of deck members in their raised positions.

Referring firstly to FIG. 1 there is shown a Texas gate assembly 10 including a base frame 12 adapted to be set into a roadway. The roadway is not shown but the general direction of the roadway is given by the arrow A. A deck assembly 14 is secured to the base frame and when the base frame has been properly set into the roadway, the deck assembly is approximately flush with the top of the roadway, the level of which is indicated by the dashed lines GL. In a typical installation a shallow pit or trench is located beneath the Texas gate assembly in order to provide space for debris and dirt to accumulate, which debris typically falls off the wheels of the vehicular traffic passing thereover.

As shown in the drawings, the deck assembly comprises a series of spaced parallel elongated tubular members 16 which are arranged in groups. A first group 18 and a second group 20 of these tubular deck members 18 are affixed to the base frame 12 in spaced apart flanking relationship to a central region 22 of the gate assembly. Additionally, there are two further groups of tubular deck members identified as group 24 and group 26. These two further groups 24 and 26 are pivotally mounted for movement from a lowered position overlying the central region 22 and supported on base frame 12 in co-planar relation to the first and second groups 18 and 20, to a raised position (as shown in FIG. 1) providing access to the pit or trench beneath the central region 22 of the gate assembly thereby to facilitate removal of debris therefrom and also to provide a barrier to road or vehicular traffic.

As best seen in FIG. 1, the two further groups 24 and 26 of tubular deck members 16 are pivotally mounted for rotation in opposing directions as illustrated by arrows B relative to the fixed first and second groups 18 and 20, between the raised and lowered positions.

Figure 4:
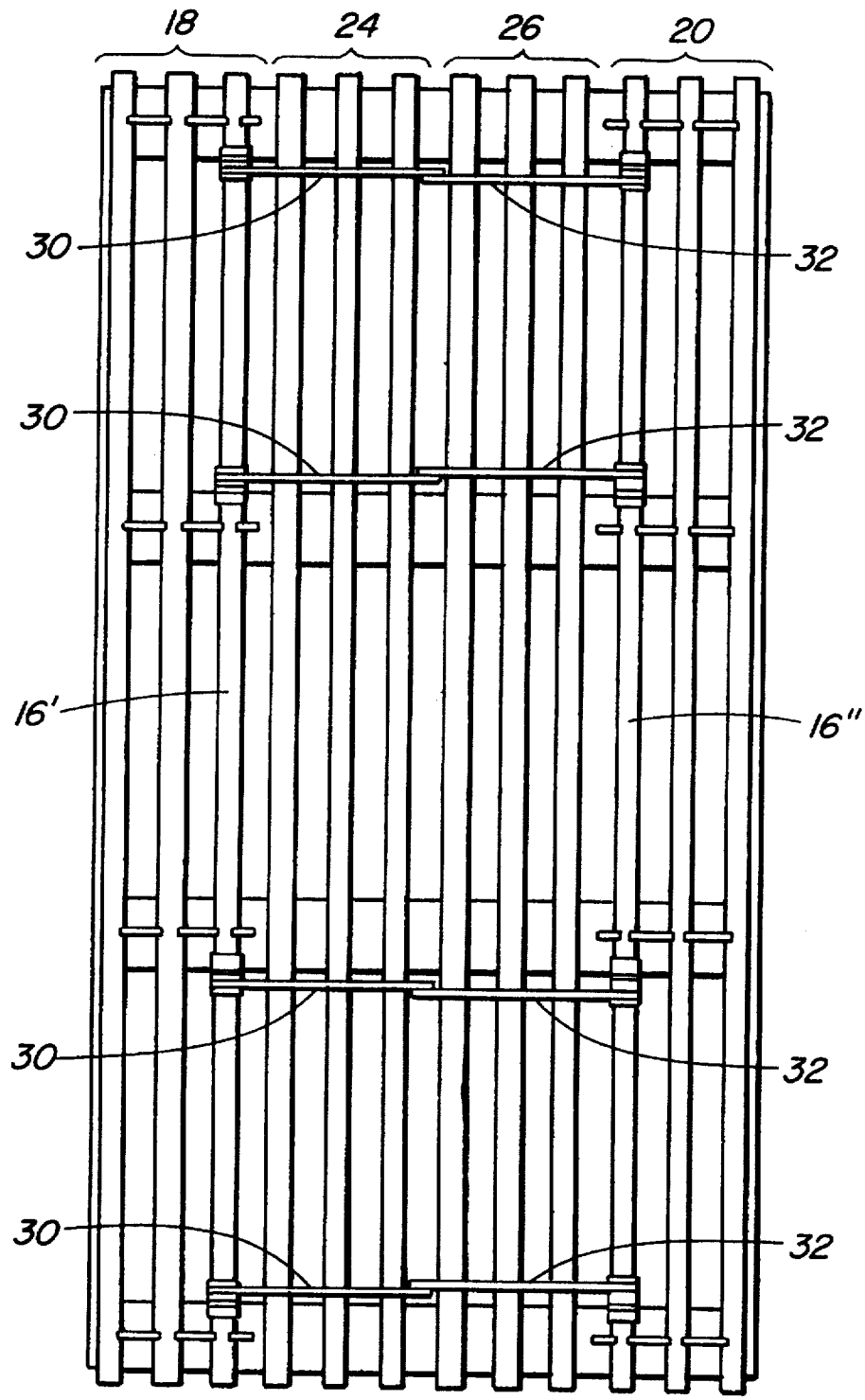
FIG. 4 is a top plan view of the complete Texas gate assembly.
Figure 5:
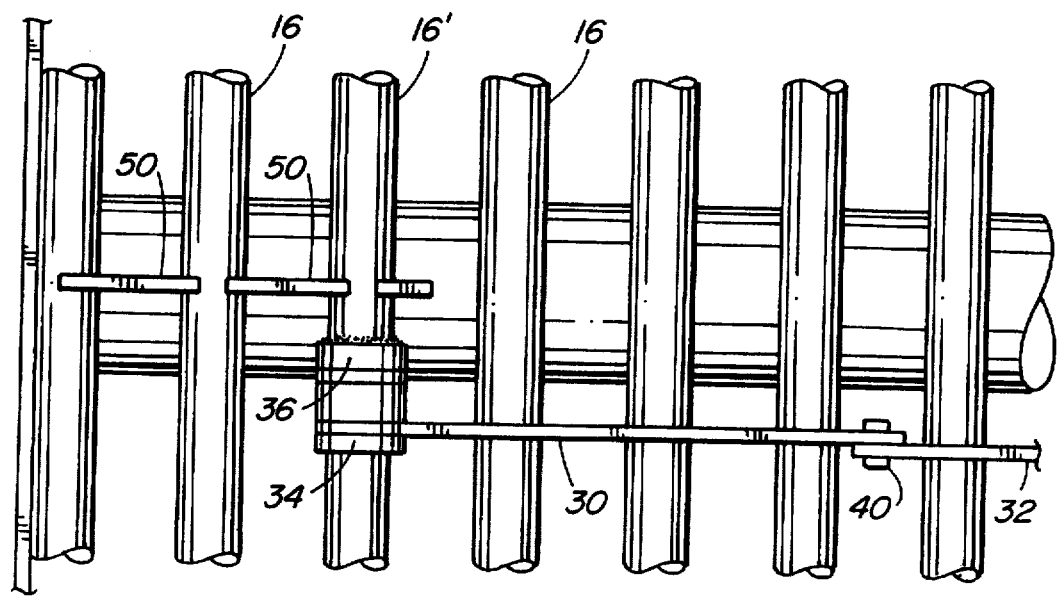
FIG. 5 is a top plan view of a portion of the assembly showing the manner in which certain of the deck members are pivotally mounted for movement.
Figure 6:
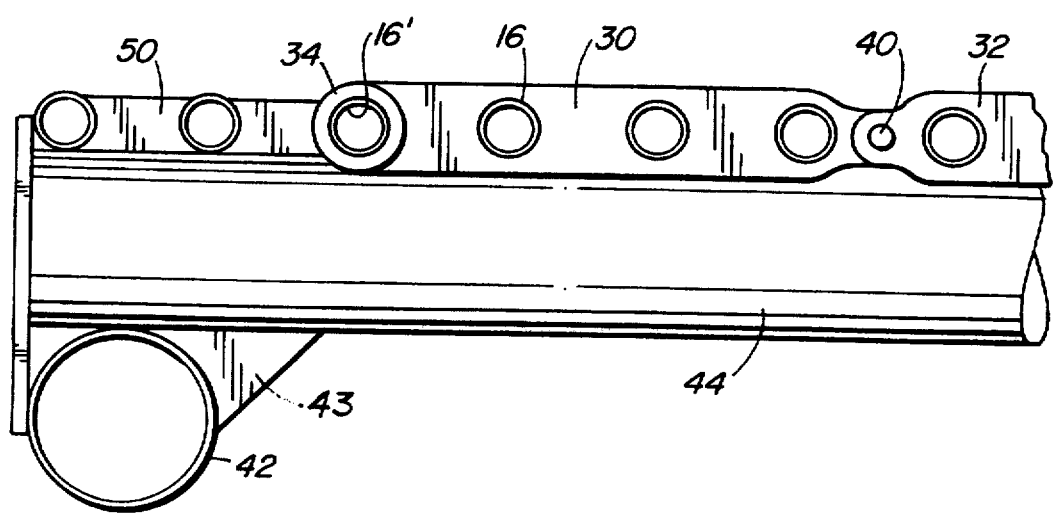
FIG. 6 is an end elevation view of that portion of the structure as illustrated in FIG. 5.

As best seen in FIGS. 4–6, the tubular deck members 16 of the pivotally mounted further groups 24 and 26, are rigidly secured together by a series of spaced apart parallel hinge plates 30 and 32. The hinge plates 30 of the pivoting group 24 are rotatably mounted to the innermost tubular deck member 16' of the first fixed group 18 while the hinge plates 32 of the other pivoting group 26 are pivotally mounted to the innermost tubular member 16" of the second fixed group of deck members 20. These deck members 16' and 16" act as the hinge pins for the pivoting groups of deck members 24 and 26.

As best seen in FIGS. 5 and 6, the hinge plates 30 and 32 are provided with spaced apertures through which the tubular deck members 16 extend, with the tubular deck members 16 being firmly welded to the hinge plates 30 and 32 thereby to provide the necessary structural strength and rigidity to each of the pivotally mounted groups of deck members 24, 26. Each hinge plate 30, 32 is also provided at its radially inner end with a hinge collar 34 to facilitate rotation thereof about the associated fixed tubular deck members 16', 16" of the first and second fixed groups of members 18, 20 as noted previously. Suitable fixed collars 36 are welded to the associated deck members 16', 16" just outboard of the associated hinge collars 34 thereby to prevent any substantial amount of endwise sliding motion of the hinge collars and their associated hinge plates 30, 32, along the respectively associated deck members 16', 16".

When the pivotally mounted groups of deck members 24, 26 are in their lowered horizontal positions, the adjacent outermost ends of the hinge plates 30, 32, overlap with one another slightly and these are preferably provided with mating apertures so that a locking bolt 40 may be positioned therein thereby to secure the Texas gate in its normal "in use" horizontal position.

Figures 2, 3:
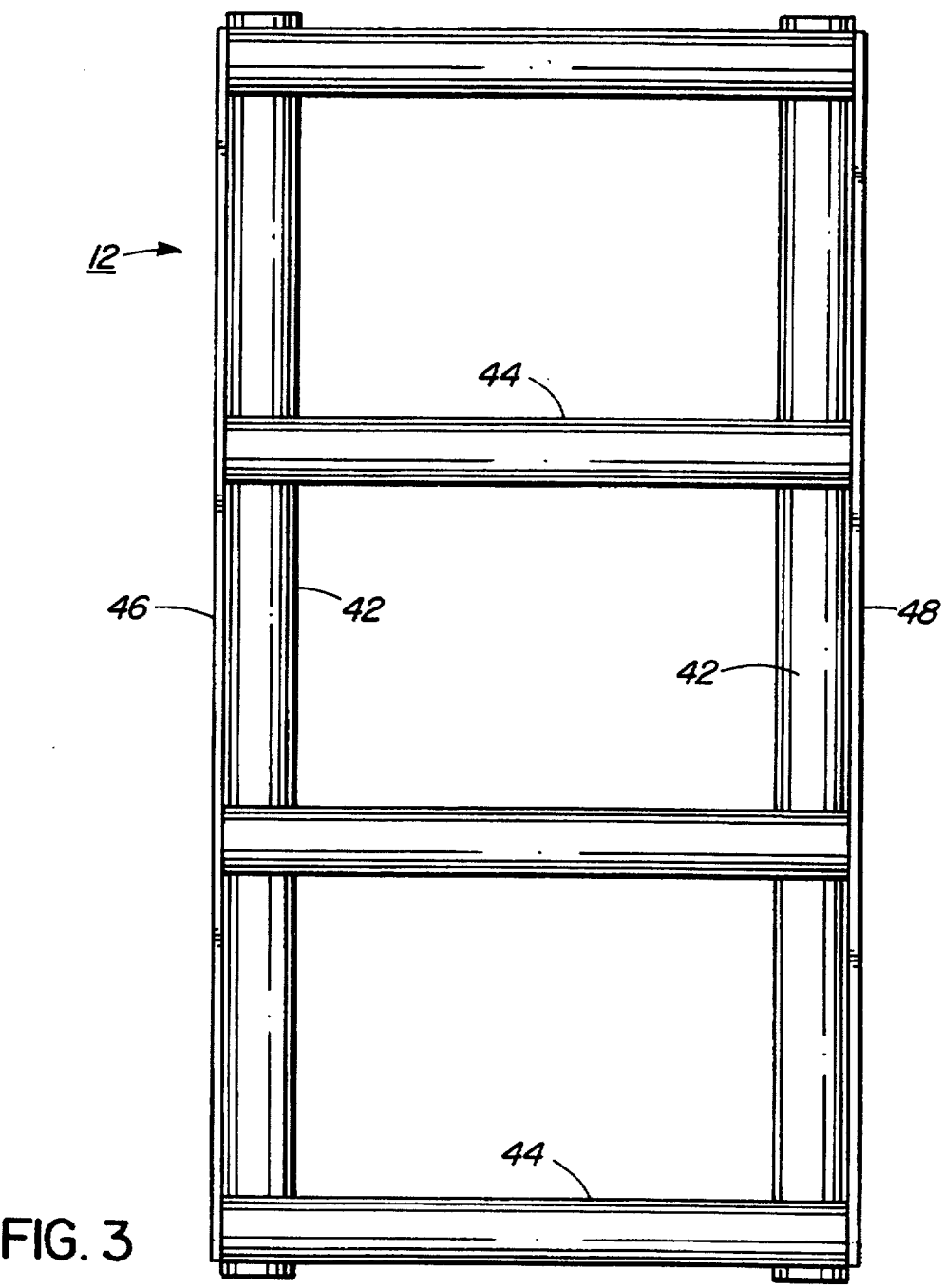
FIG. 2 is an end elevation view of the base frame portion of the Texas gate assembly.
FIG. 3 is a top plan view of the base frame assembly.

The previously noted base frame 12 includes a spaced pair of longitudinal bottom sills 42 which bear against the underlying earth and support the weight of the entire gate assembly. These longitudinal sills 42 extend parallel to the tubular deck members 16 and at the same time extend transversely to the roadway direction. As best seen in FIG. 3, a plurality, in this case four, parallel sills 44 are supported on and are affixed by welding to the longitudinal sills 42 and extend transversely relative to them. Suitable gusset plates 43 are typically provided between the longitudinal sills 42 and the transverse sills 44 thereby to provide for better force distribution to reduce stress concentrations. A pair of longitudinally extending side plates 46 and 48 are provided which are secured to and extend substantially the full lengths of the longitudinally extending sills 42; these plates assist in stabilizing the whole structure and also assist in preventing earth from caving in on the opposing sides of the gate assembly and impeding the operation of same. It will also be seen that the first and second fixed groups of deck members 18 and 20 are firmly welded to the upper extremities of the transversely extending sills 44 adjacent opposing ends thereof. As best seen in FIGS. 5 and 6, welded gusset plates 50 extending between the fixed deck members 16,16' and 16,16" serve to secure these fixed deck members both to one another and to the transversely extending sills 44.

The Texas gate assembly as described above can be manufactured quite economically owing to the fact that all of the components used are readily available commercially and need not be specially fabricated. Both the tubular deck members 16 as well as the base frame sills 42, 44 comprise heavy gauge steel pipes with the sills 42, 44 being of substantially greater diameter than the tubular members 16 as illustrated in the drawings. In one typical embodiment, the tubular deck members were made from heavy gauge pipe having an outside diameter of 2 and ⅞th inches. The base frame sills were made of heavy steel gauge pipes having diameters of 8 and ⅝th inches. The Texas gate may be of any desired length and width; in one typical embodiment the lengthwise dimension of the gate (at right angles to the roadway direction) was approximately 15 feet 6 inches with a transverse dimension of approximately 7 feet.

The Texas gate assembly as described is typically prefabricated at a suitable location and transported as a complete unit to the place where it is to be used. The roadway in question will be provided with a shallow depression or excavation sufficiently deep as to allow the gate assembly to be set down into it such that the deck assembly 14, when installed, is substantially flush with the roadway surface. During the course of use, earth and other debris falling from the vehicles passing over the Texas gate will gradually accumulate beneath the central region 22 of the gate assembly. At the desired time the pivotally mounted groups of deck members 24, 26 can be easily swung upwardly as in FIG. 1 thereby to allow personnel to gain access to this central area for clean out purposes and/or to impede flow of vehicular traffic along the roadway for security purposes or otherwise.

When a need for the Texas gate assembly no longer exists as, for example, when an oil well site is closed or abandoned, the entire Texas gate assembly may be easily removed as a unit and transported to another location. No special base or foundation is required as is the case with most of the known prior art Texas gate configurations. Other advantages of the Texas gate configuration as described above will be readily apparent to those skilled in this art.

A preferred embodiment of the invention has been described and illustrated by way of example. Those skilled in the art will realize that various modifications and changes may be made while still remaining within the spirit and scope of the invention. Hence the invention is not to be limited to the embodiment as described but, rather, the invention encompasses the full range of equivalencies as defined by the appended claims.

I claim:

1. A Texas gate assembly comprising a base frame adapted to be set into a roadway and a deck assembly secured to said base frame, said deck assembly comprising a series of spaced parallel elongated deck members arranged in groups, first and second groups of said deck members being fixed to said base frame in spaced apart flanking relation to a central region of the gate assembly, and at least one further group of deck members mounted for pivotal movement together in unison from a lowered position overlying said central region and supported on said base frame in co-planar relation to said first and second groups of deck members to a raised position above said first and second groups and providing access to an area beneath said central region of the gate assembly to facilitate removal of debris therefrom and/or to provide a barrier to road traffic.

2. The Texas gate of claim 1 wherein there are two said further groups of deck members, each said further group being pivotally mounted for rotation together in unison in opposing directions away from one another relative to said first and second groups between said raised and lowered positions.

3. The Texas gate of claim 2 wherein the deck members of said pivotally mounted further groups are rigidly secured together by spaced apart hinge plates, the hinge plates of each of the further groups being rotatably mounted to respective ones of the fixed deck members of the fixed first and second groups.

4. The Texas gate of claim 3 wherein said elongated deck members comprise tubular members.

5. The Texas gate of claim 4 wherein said hinge plates are provided with spaced apertures through which the deck members extend, with said deck members being welded to said hinge plates, each said hinge plate being provided with a hinge collar to facilitate rotation thereof about the associated fixed deck members of the first and second groups.

6. The Texas gate of claim 1 wherein said base frame comprises a spaced pair of longitudinal sills extending parallel to said deck members, and a plurality of spaced apart parallel sills supported on and fixed to said longitudinal sills and extending transversely thereto, with said deck assembly being disposed on said transversely extending sills with said first and second groups of deck members being fixed thereto.

7. The Texas gate of claim 6 wherein said deck members and said base frame sills comprise steel pipes, said sills being of substantially greater diameter than said deck members.

8. The Texas gate of claim 5 wherein said base frame comprises a spaced pair of longitudinal sills extending parallel to said deck members, and a plurality of spaced apart parallel sills supported on and fixed to said longitudinal sills and extending transversely thereto, with said deck assembly being disposed on said transversely extending sills with said first and second groups of deck members being fixed thereto.

9. The Texas gate of claim 8 wherein said deck members and said base frame sills comprise steel pipes, said sills being of substantially greater diameter than said deck members.

* * * * *

UNITED STATES PATENT AND TRADEMARK OFFICE
CERTIFICATE OF CORRECTION

PATENT NO. : 5,595,370
DATED : January 21, 1997
INVENTOR(S) : Eugene James Heck

It is certified that error appears in the above-indentified patent and that said Letters Patent is hereby corrected as shown below:

Title Page, after [22] Filed: Sep. 5, 1995, insert
--[30] Foreign Application Priority Data
    Aug. 1, 1995 [CA] ............ 2155147--.

Signed and Sealed this

Tenth Day of June, 1997

*Attest:*

BRUCE LEHMAN

*Attesting Officer*     *Commissioner of Patents and Trademarks*